United States Patent
Yu et al.

(10) Patent No.: US 8,917,622 B2
(45) Date of Patent: Dec. 23, 2014

(54) METHOD FOR SELECTING MODULATION AND CODING SCHEME, BASE STATION COMMUNICATION MODULE AND CUSTOMER PREMISE EQUIPMENT COMMUNICATION MODULE

(71) Applicant: Gemtek Technology Co., Ltd., Hukou Township, Hsinchu County (TW)

(72) Inventors: Chien-Tse Yu, Guishan Township, Taoyuan County (TW); Wan-Yu Wang, Taichung (TW); Fu-Ming Yeh, Hukou Township, Hsinchu County (TW)

(73) Assignee: Gemtek Technology Co., Ltd., Hukou Township, Hsinchu County (TW)

( * ) Notice: Subject to any disclaimer, the term of this patent is extended or adjusted under 35 U.S.C. 154(b) by 87 days.

(21) Appl. No.: 13/756,050

(22) Filed: Jan. 31, 2013

(65) Prior Publication Data
US 2014/0211643 A1 Jul. 31, 2014

(51) Int. Cl.
*H04W 24/02* (2009.01)
(52) U.S. Cl.
CPC ..................................... *H04W 24/02* (2013.01)
USPC .............. 370/252; 370/328; 375/227; 455/69
(58) Field of Classification Search
None
See application file for complete search history.

(56) References Cited

U.S. PATENT DOCUMENTS

| | | | | |
|---|---|---|---|---|
| 6,748,021 | B1 * | 6/2004 | Daly | 375/261 |
| 2008/0240216 | A1 * | 10/2008 | Kolding et al. | 375/227 |
| 2009/0180413 | A1 * | 7/2009 | Sutton | 370/311 |
| 2012/0243473 | A1 * | 9/2012 | Kadous et al. | 370/328 |

* cited by examiner

*Primary Examiner* — Chi H Pham
*Assistant Examiner* — Shick Hom
(74) *Attorney, Agent, or Firm* — Muncy, Geissler, Olds & Lowe, P.C.

(57) ABSTRACT

A Base Station (BS) communication module and a Customer Premise Equipment (CPE) communication module are adapted to implement a method for selecting a Modulation and Coding Scheme (MCS). The method for selecting an MCS includes the following steps: receiving a plurality of first packets in a first period, and calculating a Packet Error Rate (PER); determining whether the PER is greater than an error rate threshold; and when the PER is greater than the error rate threshold, performing the following steps: obtaining a Carrier to Interference plus Noise Ratio (CINR) return value; performing an adjusting procedure to obtain a CINR adjustment value; calculating an actual return value according to the CINR return value and the CINR adjustment value; and selecting one of a plurality of MCSs according to the actual return value.

15 Claims, 5 Drawing Sheets

METHOD FOR SELECTING MODULATION AND CODING SCHEME, BASE STATION COMMUNICATION MODULE AND CUSTOMER PREMISE EQUIPMENT COMMUNICATION MODULE

TECHNICAL FIELD

The disclosure relates to a method for selecting a Modulation and Coding Scheme (MCS), a Base Station (BS) communication module and a Customer Premise Equipment (CPE) communication module, and more particularly to a method for selecting an MCS, and a BS communication module as well as a CPE communication module that use a Carrier to Interference plus Noise Ratio (CINR).

BACKGROUND

A compliant MCS is critical to the Worldwide Interoperability for Microwave Access (WiMAX) technology, to ensure the communication quality between a BS and a CPE. In the WiMAX-supported MCS, three modulation types exist, that is, Quadrature Phase Shift Keying (QPSK), 16 Quadrature Amplitude Modulation (QAM) and 64 QAM. The BS may change the modulation mode according to the increase or decrease of a parameter CINR which is returned by the CPE and represents the communication quality.

However, in practice, one MCS is not adapted to the same CINR in all the channel environments between the BS and the CPE. The CINR is merely an averaged signal quality factor, so that it is inappropriate to select the MCS only according to the CINR in the actual channel environment. When the CINR is overestimated, the BS selects a high modulation and coding mode, which causes plenty of packet errors and reduces the transmission efficiency. In contrast, when the CINR is underestimated, a modulation and coding mode of a low transmission rate is adopted, which causes a waste of wireless resources.

SUMMARY

In an embodiment, the disclosure provides a method for selecting a Modulation and Coding Scheme (MCS). In the method, a plurality of first packets are received in a first period and a Packet Error Rate (PER) is calculated according to the first packets. Whether or not the PER is greater than an error rate threshold is determined. When the PER is greater than the error rate threshold, the following steps are performed. In these steps, a Carrier to Interference plus Noise Ratio (CINR) return value is obtained. An adjusting procedure is performed in order to obtain a CINR adjustment value. According to the CINR return value and the CINR adjustment value, an actual return value is calculated. One of a plurality of MCSs is selected according to the actual return value.

In another embodiment, the disclosure provides a Base Station (BS) communication module comprising a first communication unit, a Carrier to Interference plus Noise Ratio (CINR) adjusting unit and a Modulation and Coding Scheme (MCS) selecting unit. The first communication unit is configured for receiving a plurality of first packets in a first period. The Carrier to Interference plus Noise Ratio (CINR) adjusting unit is configured for performing the following steps: calculating a Packet Error Rate (PER) according to the first packets; determining whether the PER is greater than an error rate threshold; and when the PER is greater than the error rate threshold, performing the following steps: obtaining a CINR return value; performing an adjusting procedure to obtain a CINR adjustment value; and calculating an actual return value according to the CINR return value and the CINR adjustment value. The Modulation and Coding Scheme (MCS) selecting unit is configured for selecting one of a plurality of MCSs according to the actual return value.

The disclosure further provides a Customer Premise Equipment (CPE) communication module communicating with a Base Station (BS) communication module. The CPE communication module comprises a second communication unit and a Carrier to Interference plus Noise Ratio (CINR) adjusting unit. The second communication unit is configured for receiving a plurality of first packets in a first period. The CINR adjusting unit is configured for performing the following steps: calculating a Packet Error Rate (PER) according to the first packets; determining whether the PER is greater than an error rate threshold; and when the PER is greater than the error rate threshold, performing the following steps: obtaining a CINR return value; performing an adjusting procedure to obtain a CINR adjustment value; calculating an actual return value according to the CINR return value and the CINR adjustment value; and sending the actual return value to the BS communication module, so that the BS communication module selects one of a plurality of Modulation and Coding Schemes (MCSs) according to the actual return value.

BRIEF DESCRIPTION OF THE DRAWINGS

The disclosure will become more fully understood from the detailed description given herein below for illustration only, thus does not limit the disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure provides a method for selecting an MCS, and provides a BS communication module as well as a CPE communication module. The BS communication module or the CPE communication module is adapted to implement the method for selecting an MCS.

Figure 1:
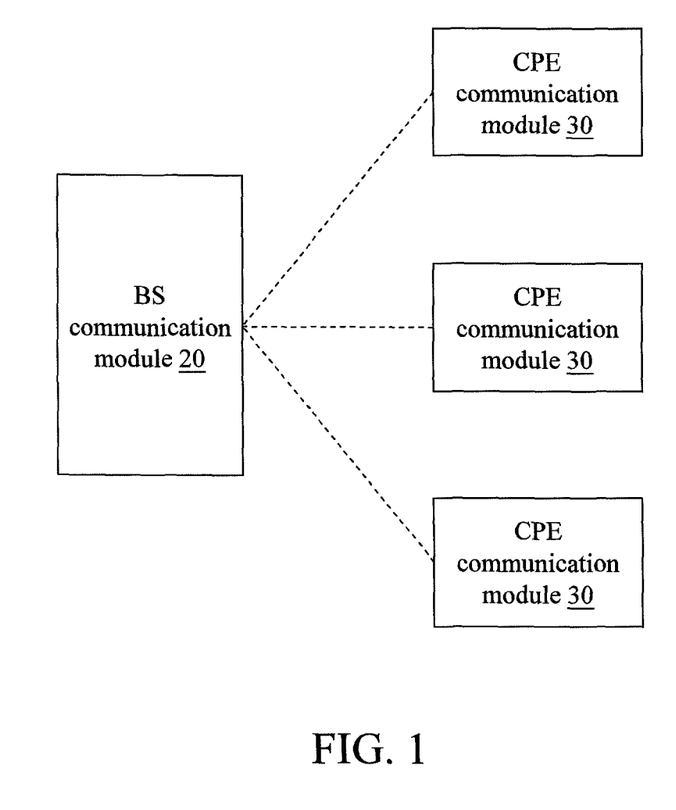
FIG. 1 is a block diagram of communication between a BS communication module and CPE communication modules according to an embodiment.

FIG. 1 is a block diagram of communication between a BS communication module and CPE communication modules according to an embodiment. In this and some other embodiments, a BS communication module 20 of a BS can communicate with CPE communication modules 30 of a plurality of CPEs at the same time and the communications among them are in a wireless mode by using wireless communication protocols such as WiMAX or Long Term Evolution (LTE).

The CPE is, for example, an electronic apparatus such as a mobile phone, a notebook computer, a tablet computer or a portable game machine, and is capable of running a wireless network access or call service through the communication between the CPE communication module 30 and the BS.

In this and some other embodiments, the method for selecting an MCS selects an appropriate MCS according to the communication quality between the BS communication module 20 and the CPE communication module 30, and determines the communication quality according to both a CINR return value and a PER. Simply put, the method for selecting an MCS adjusts the CINR return value according to the PER, so as to more accurately reflect the communication quality.

Figure 2:
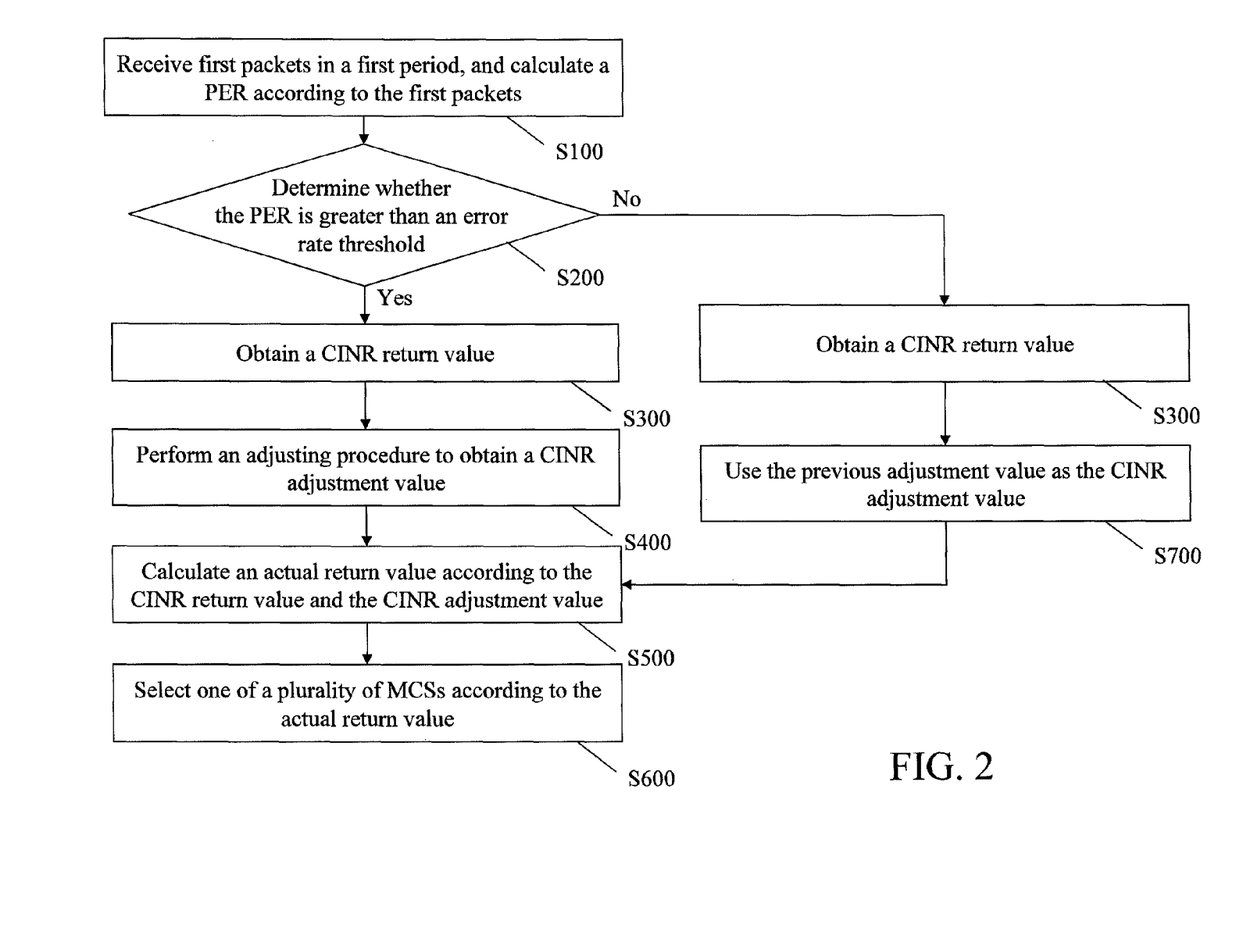
FIG. 2 is a flow chart of a method for selecting an MCS according to an embodiment.

FIG. 2 is a flow chart of a method for selecting an MCS according to an embodiment. The BS communication module 20 or the CPE communication module 30 that implements the method for selecting an MCS is referred to as a working module hereinafter. In this and some other embodiments, the working module performs Step S100 to Step S700, to make statistics on the PER at a set time interval and select the MCS corresponding to the time interval.

Figure 3:
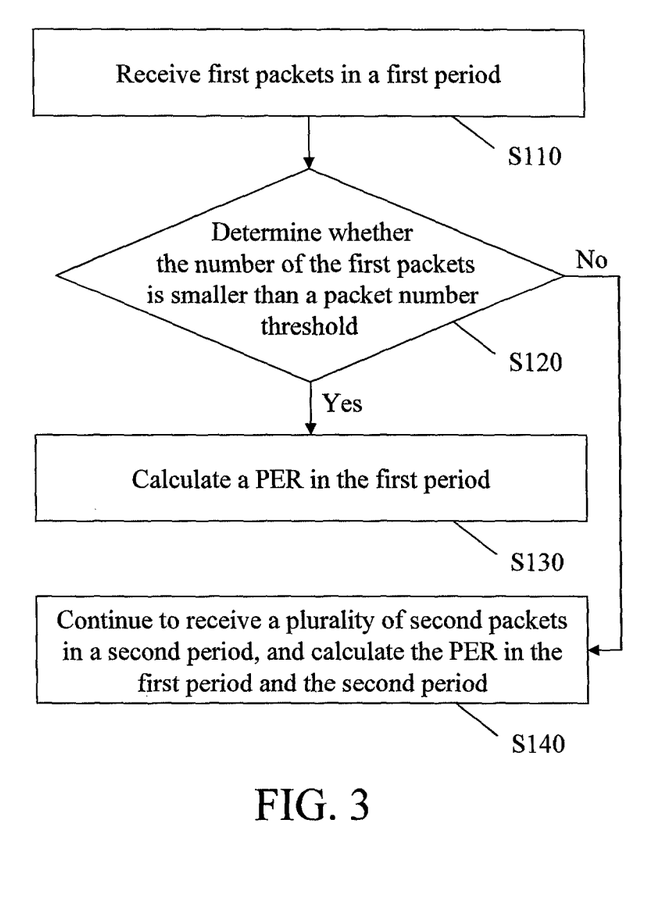
FIG. 3 is a flow chart of Step S100 according to an embodiment.

The working module first receives a plurality of first packets in a first period in a wireless mode, and calculates a PER according to the received first packets (Step S100). To ensure the validity of the calculated PER, the received packets are accumulated to a certain number and then the PER is calculated. FIG. 3 is a flow chart of Step S100 according to an embodiment.

The working module receives a plurality of first packets in a first period (Step S110), and determines whether the number of the received first packets is smaller than a packet number threshold (Step S120). For example, the working module is capable of receiving the first packets from the BS communication module 20 or the CPE communication module 30 in 5 seconds or 10 seconds, and then calculating the total number of the first packets received in this period.

When the number of the first packets is greater than the packet number threshold, the working module directly calculates a PER in the first period according to the first packets (Step S130). However, when the number of the first packets is smaller than or equal to the packet number threshold, the working module continues to receive a plurality of second packets in a second period, and calculates the PER in the first period and the second period according to the first packets and the second packets (Step S140). In an embodiment, the working module continuously receives the first packets and the second packets, no matter whether the number of the first packets is greater than the packet number threshold. When the number of the first packets is greater than the packet number threshold, the working module performs the subsequent steps S200 to S700, and meanwhile continues to receive the second packets.

Furthermore, in this and some other embodiments, after the second period ends, the working module first determines whether the total number of the received first packets and second packets is greater than the packet number threshold. Then, if not, continues to receive the packets till the total number of the received packets is greater than the packet number threshold and calculates the PER according to the received packets. Similarly, in this and some other embodiments, the working module continuously receives the packets, no matter whether the total number of the first packets and the second packets is greater than the packet number threshold. When the total number of the first packets and the second packets is greater than the packet number threshold, the working module performs the subsequent steps S200 to S700, and meanwhile continues to receive other packets. The PER is reset when the BS communication module 20 is reconnected with the CPE communication module 30.

After obtaining a valid PER, the working module determines whether the PER is greater than an error rate threshold (Step S120), to decide how to adjust a CINR return value. When the PER is greater than the error rate threshold, it is indicated that the wireless communication quality is unsatisfactory, and the following steps S300 to S600 are performed.

The working module first obtains a CINR return value (Step S300), and performs an adjusting procedure to obtain a CINR adjustment value (Step S400). For each channel in wireless communication, the working module continuously performs channel measurement to obtain the CINR return value. In this and some other embodiments, the CINR return value is estimated and computed by a physical (PHY) chip in a PHY layer of the working module. Conventionally, the CPE periodically obtains the CINR return value and directly sends the CINR return value to the BS, but the method for selecting an MCS of the disclosure adjusts the CINR return value according to the PER, so as to more accurately reflect the communication quality.

Figure 4:
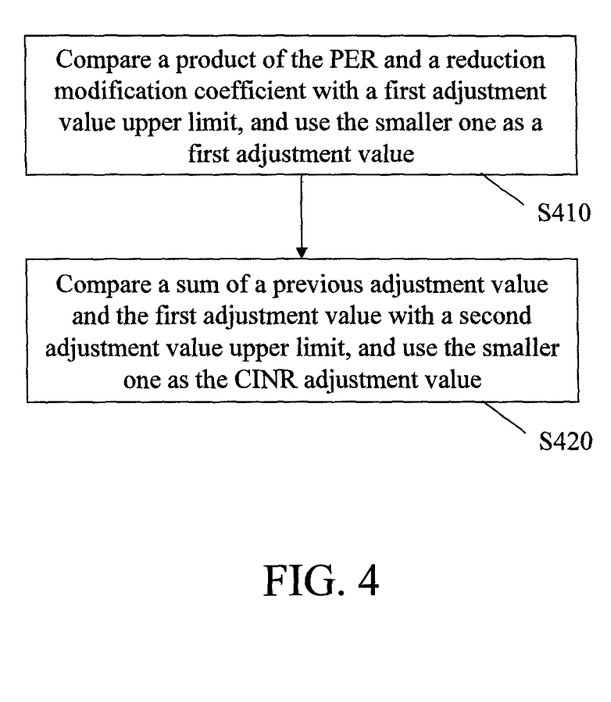
FIG. 4 is a flow chart of an adjusting procedure according to an embodiment.

FIG. 4 is a flow chart of an adjusting procedure according to an embodiment. The adjusting procedure compares a product of the PER and a reduction modification coefficient with a first adjustment value upper limit, and uses the smaller one as a first adjustment value (Step S410).

In other words, the adjusting procedure first calculates a product of the PER and the reduction modification coefficient, compares the product with the first adjustment value upper limit and the smaller one of the product and the first adjustment value upper limit is regarded as the first adjustment value. The reduction modification coefficient is, for example, a preset constant, and can be determined by the user.

When the PER is large, the CINR return value estimated by the PHY layer has low accuracy, and reduction modification needs to be performed on the obtained CINR return value to meet the actual communication quality. Therefore, basically the larger the PER is, the greater the first adjustment value is. However, to avoid that the reduction modification is excessively performed to cause that the subsequently selected MCS is too low and the transmission efficiency is reduced or even cause jitter of the transmission quantity, the first adjustment value upper limit is set to limit the maximum quantity that can be adjusted each time.

The adjusting procedure compares a sum of a previous adjustment value and the first adjustment value with a second adjustment value upper limit, and uses the smaller one as the CINR adjustment value (Step S420). Specifically, the working module makes statistics on the PER at a set time interval (for example, the first period), and calculates the CINR adjustment value corresponding to the time interval. After the adjustment ends, the currently obtained CINR adjustment value is recorded as the previous adjustment value, and is used for the next adjustment. Generally, the first adjustment value calculated in Step S410 is added with the previous adjustment value to serve as the final CINR adjustment value. Similarly, in this and some other embodiments, to maintain the stability of the communication state, reference is made to the second adjustment value upper limit by the adjusting procedure, to avoid that the CINR adjustment value becomes excessively large. The first adjustment value upper limit and the second adjustment value upper limit are, for example, preset constants, and can be determined by the user.

After obtaining the CINR adjustment value, the working module calculates an actual return value according to the CINR return value and the CINR adjustment value (Step S500). In an embodiment, the CINR adjustment value is subtracted from the CINR return value and an obtained difference is directly used as the actual return value. Finally, one of a plurality of MCSs is selected according to the actual return value (Step S600).

In an embodiment, when the PER is smaller than or equal to the error rate threshold, the working module obtains the CINR return value (Step S300), and directly uses the previous adjustment value as the CINR adjustment value (Step S700).

Figure 5:
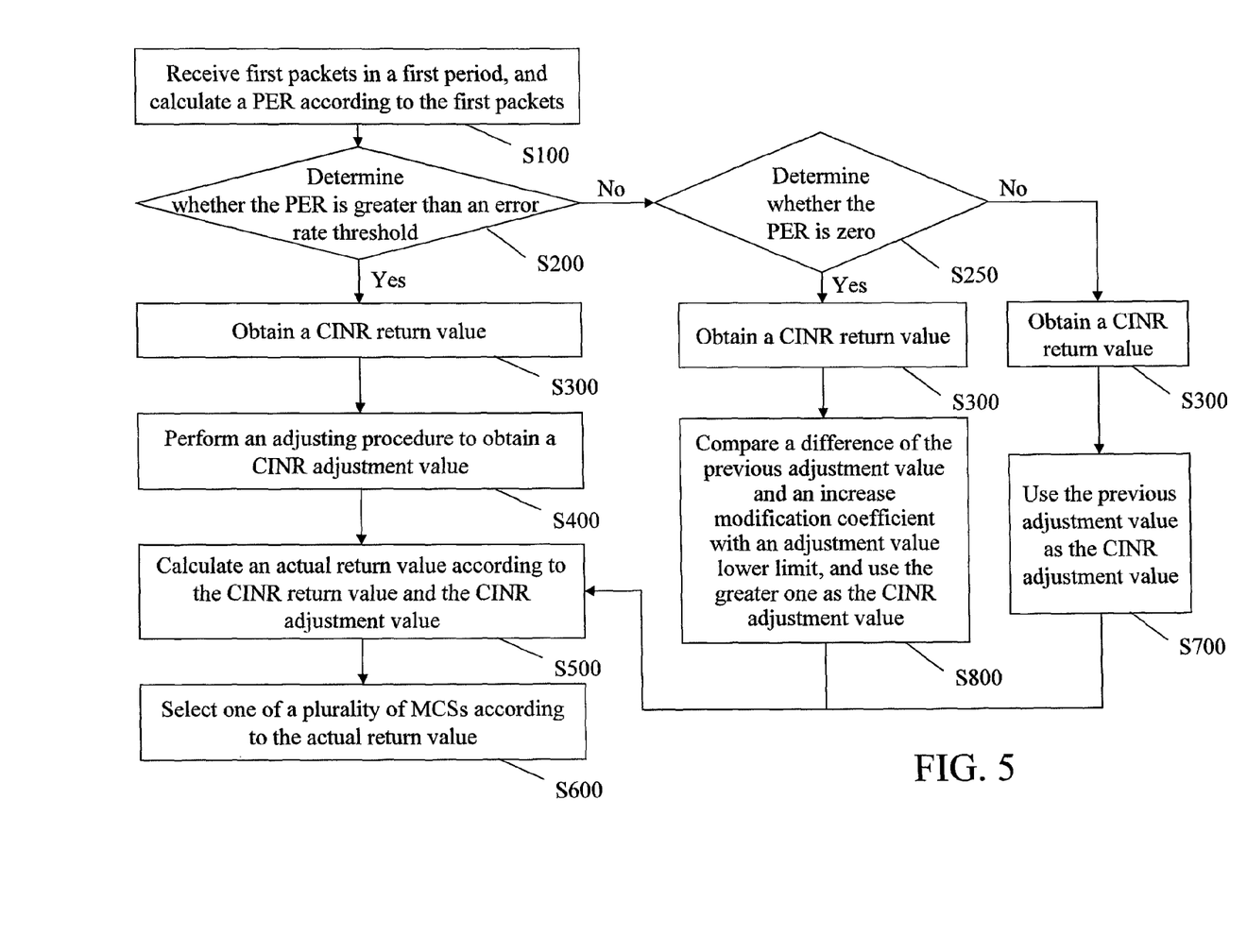
FIG. 5 is a flow chart of a method for selecting an MCS according to another embodiment.

In another embodiment, when the PER is equal to the error rate threshold, it is indicated that the current communication quality is satisfactory. Therefore, the method for selecting an MCS can reduce the CINR adjustment value. FIG. 5 is a flow chart of a method for selecting an MCS according to another embodiment. When the PER is smaller than or equal to the error rate threshold, the working module determines whether the PER is zero (Step S250). When the PER is not zero, the CINR return value is obtained (Step S300), and the previous adjustment value is directly used as the CINR adjustment value (Step S700).

In this and some other embodiments, when the PER is zero, it is indicated that the current communication quality is excellent, but the transmission rate of the currently used MCS is too low. The working module compares a difference of the previous adjustment value and an increase modification coefficient with an adjustment value lower limit, and uses the greater one as the CINR adjustment value (Step S800). Specifically, the working module subtracts the increase modification coefficient from the previous adjustment value to obtain a difference: it compares the difference with the adjustment value lower limit, and uses the greater one of the difference and the adjustment value lower limit as the CINR adjustment value. The increase modification coefficient is, for example, a preset constant, and can be determined by the user.

In this and some other embodiments, the CINR adjustment value is a positive value or a negative value. When the CINR adjustment value is a positive value, the actual return value is smaller than the CINR return value. In contrast, when the CINR adjustment value is a negative value, the actual return value is greater than the CINR return value. Therefore, the method for selecting an MCS is able to increase or decrease the actual return value according to the PER, and to select different MCSs accordingly.

Generally, the first adjustment value upper limit and the second adjustment value upper limit are positive values, for example, 5 dB; and the adjustment value lower limit is a negative value, for example, −2 dB. The first adjustment value upper limit, the second adjustment value upper limit and the adjustment value lower limit are set to ensure that when the method for selecting an MCS is repeatedly performed, the actual return value may not be unlimitedly increased or decreased, so as to achieve the stability of the whole communication scenario.

Figure 6:
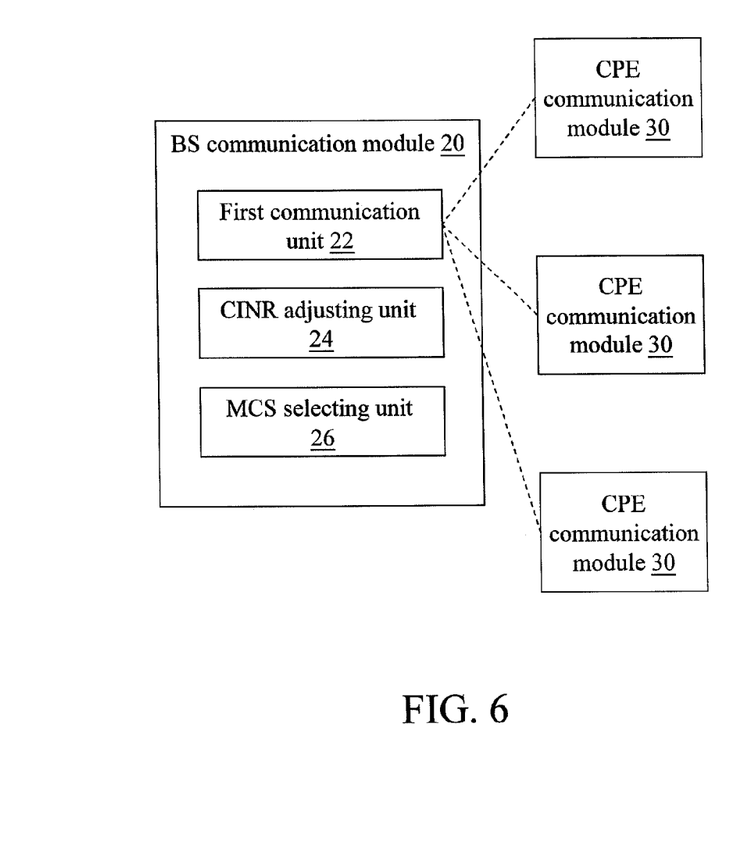
FIG. 6 is a block diagram of a BS communication module according to an embodiment.

In an embodiment, the method for selecting an MCS is implemented in the BS communication module 20. FIG. 6 is a block diagram of a BS communication module according to an embodiment. In this and some other embodiments, the BS communication module 20 comprises a first communication unit 22, a CINR adjusting unit 24 and an MCS selecting unit 26. The BS communication module 20 is, for example, an uplink module or a downlink module in the BS.

The first communication unit 22 is configured for continuously receiving and transmitting packets in a wireless mode during the first period, the second period or a subsequent period. The first communication unit 22 makes statistics on the total number of the packets received so far, and the total number of the packets to which an error occurs so far.

At the very beginning, the CINR adjusting unit 24 first waits (or idles away) a first period, and inquires the first communication unit 22 for the total number of the packets received so far and the total number of the packets to which an error has occurred so far. The CINR adjusting unit 24 compares the newly inquired data with the data inquired the previous time, and calculates the PER in the first period. However, When the number of the first packets is smaller than the packet number threshold, the CINR adjusting unit 24 continues to wait a second period, then inquires the first communication unit 22, it calculates the total number of the first packets and the second packets, and accordingly calculates the PER in the first period plus the second period.

The CINR adjusting unit 24 performs the steps S200, S250, S300, S400, S500, S700 and S800, to calculate the actual return value according to the CINR return value and the PER. When the BS communication module 20 is a downlink module of the BS, the CINR adjusting unit 24 calculates the PER by using a Hybrid Automatic Repeat reQuest (HARQ) technology. When the BS communication module 20 is an uplink module of the BS, the CINR adjusting unit 24 calculates the PER by using the HARQ or a packet Cyclic Redundancy Check (packet CRC) technology.

After the MCS selecting unit 26 receives the actual return value from the CINR adjusting unit 24, Step S600 is performed to select an appropriate MCS, and the first communication unit 22 communicates with the CPE communication module 30 according to the selected MCS.

Figure 7:
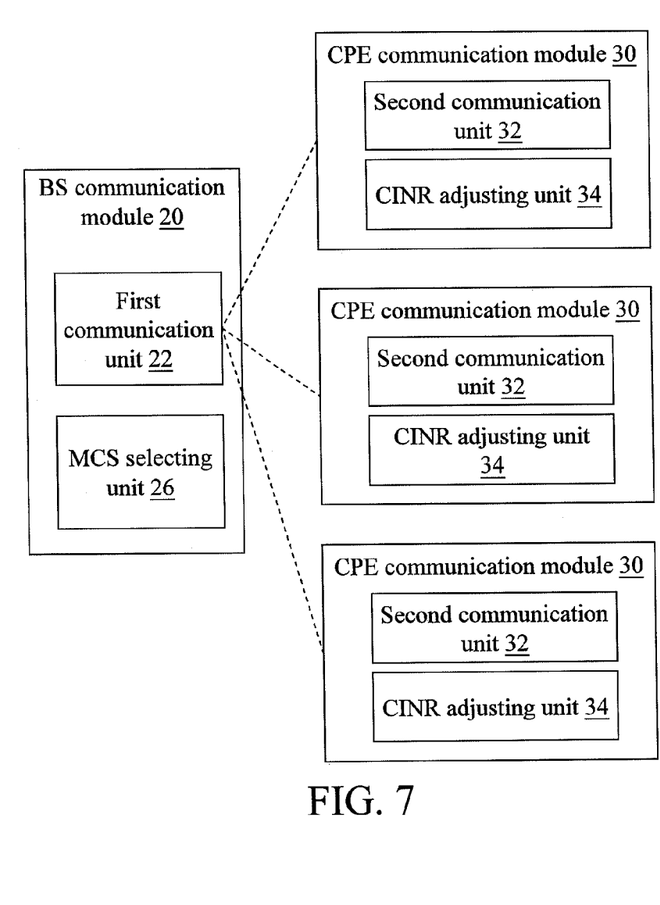
FIG. 7 is a block diagram of a CPE communication module according to an embodiment.

In an embodiment, the method for selecting an MCS is implemented in the CPE communication module 30. FIG. 7 is a block diagram of a CPE communication module according to an embodiment. In this and some other embodiments, the CPE communication module 30 comprises a second communication unit 32 and a CINR adjusting unit 34. The CPE communication module 30 is, for example, an uplink module in the CPE.

The second communication unit 32 is configured for continuously receiving and transmitting packets in a wireless mode during the first period, the second period or a subsequent period, and is configured for communicating with the first communication unit 22. The second communication unit 32 makes statistics on the total number of the packets received so far, and the total number of the packets to which an error occurs so far.

Similar to the CINR adjusting unit 24, the CINR adjusting unit 34 first waits a first period, inquires the second communication unit 32 for related data about the packets, and accordingly calculates the PER in the first period. However, when the number of the first packets is smaller than the packet number threshold, the CINR adjusting unit 34 continues to wait a second period, and then calculates the PER in the first period plus the second period.

The CINR adjusting unit 34 implements the steps S200, S250, S300, S400, S500, S700 and S800, to calculate the actual return value according to the CINR return value and the PER. When the CPE communication module 30 is an uplink module of the CPE, the CINR adjusting unit 34 is configured for calculating the PER by using the HARQ or the packet CRC technology.

In Step S500, the CINR adjusting unit 34 of the CPE communication module 30 sends the actual return value to the BS communication module 20, and the MCS selecting unit 26 of the BS communication module 20 selects an appropriate MCS according to the actual return value. For example, the CPE communication module 30 sends the calculated actual return value through a Channel Quality Information Channel (CQICH), which affects the selection of the MCS by the downlink module of the BS.

For example, assume that the working module is the BS communication module 20, and is the downlink module of the BS. When the CINR return value obtained by the BS communication module 20 is 28 dB, the correspondingly selected MCS is 64 QAM-⅚, and the BS communication module 20 communicates with the CPE communication module 30 through the 64 QAM-⅚ rule. When the PER of the packets continuously received by the BS communication module 20 is greater than the error rate threshold, Step S300 to Step S500 are performed to reduce the actual return value.

When the PER in a plurality of consecutive first periods is greater than the error rate threshold, the CINR adjustment value is gradually increased to a positive value, and the actual return value is gradually reduced. The MCS selecting unit 26 correspondingly selects a modulation mode lower than 64 QAM-⅚. For example, selects 64 QAM-¾ as the MCS, and the BS communication module 20 communicates with the CPE communication module 30 through the 64 QAM-¾ rule.

In contrast, when the PER in a plurality of consecutive first periods is smaller than the error rate threshold, the CINR adjustment value is gradually reduced to a negative value, and the actual return value is gradually increased, so that the MCS selecting unit 26 may select a higher modulation mode.

In view of the above, the method for selecting an MCS, the BS communication module and the CPE communication module select the MCS according to both the CINR and the PER. Therefore, the CINR is prevented from being overestimated or underestimated, and an MCS that meets the transmission quality of a real-time environment is determined, thereby improving the use efficiency of wireless resources.

What is claimed is:

1. A method for selecting a Modulation and Coding Scheme (MCS), comprising:
    receiving a plurality of first packets in a first period, and calculating a Packet Error Rate (PER) according to the first packets;
    determining whether the PER is greater than an error rate threshold; and
    when the PER is greater than the error rate threshold, performing the following steps:
        obtaining a Carrier to Interference plus Noise Ratio (CINR) return value;
        performing an adjusting procedure to obtain a CINR adjustment value;
        calculating an actual return value according to the CINR return value and the CINR adjustment value; and
        selecting one of a plurality of MCSs according to the actual return value,
    wherein the adjusting procedure comprises:
        comparing a product of the PER and a reduction modification coefficient with a first adjustment value upper limit, and using the smaller one as a first adjustment value; and
        comparing a sum of a previous adjustment value and the first adjustment value with a second adjustment value upper limit, and using the smaller one as the CINR adjustment value.

2. The method for selecting the MCS according to claim 1, wherein the step of receiving the first packets in the first period, and calculating the PER according to the first packets comprises:
    receiving the first packets in the first period;
    determining whether the number of the first packets is smaller than a packet number threshold;
    when the number of the first packets is greater than the packet number threshold, calculating the PER in the first period; and
    when the number of the first packets is smaller than or equal to the packet number threshold, continuing to receive a plurality of second packets in a second period, and calculating the PER in the first period and the second period.

3. The method for selecting the MCS according to claim 1, further comprising:
    when the PER is smaller than or equal to the error rate threshold, performing the following steps:
    determining whether the PER is zero;
    when the PER is zero, performing the following steps:
        obtaining the CINR return value; and
        comparing a difference of a previous adjustment value and an increase modification coefficient with an adjustment value lower limit, and using the greater one as the CINR adjustment value;
    calculating the actual return value according to the CINR return value and the CINR adjustment value; and
    selecting one of the MCSs according to the actual return value.

4. The method for selecting the MCS according to claim 3, further comprising:
    when the PER is not zero, performing the following steps:
        obtaining the CINR return value; and
        using the previous adjustment value as the CINR adjustment value.

5. The method for selecting the MCS according to claim 1, wherein the step of calculating the actual return value according to the CINR return value and the CINR adjustment value comprises:
    subtracting the CINR adjustment value from the CINR return value and obtaining a difference as the actual return value.

6. A Base Station (BS) communication module, comprising:
    a first communication unit configured for receiving a plurality of first packets in a first period;
    a Carrier to Interference plus Noise Ratio (CINR) adjusting unit configured for performing the following steps:
        calculating a Packet Error Rate (PER) according to the first packets;
        determining whether the PER is greater than an error rate threshold; and
        when the PER is greater than the error rate threshold, performing the following steps:
            obtaining a CINR return value;
            performing an adjusting procedure to obtain a CINR adjustment value; and
            calculating an actual return value according to the CINR return value and the CINR adjustment value; and
    a Modulation and Coding Scheme (MCS) selecting unit configured for selecting one of a plurality of MCSs according to the actual return value,
    wherein the adjusting procedure comprises:
        comparing a product of the PER and a reduction modification coefficient with a first adjustment value upper limit, and using the smaller one as a first adjustment value; and comparing a sum of a previous adjustment value and the first adjustment value with a second adjustment value upper limit, and using the smaller one as the CINR adjustment value.

7. The BS communication module according to claim 6, wherein in the step of calculating the PER according to the first packets, the CINR adjusting unit performs the following steps:
   determining whether the number of the first packets is smaller than a packet number threshold;
   when the number of the first packets is greater than the packet number threshold, calculating the PER in the first period; and
   when the number of the first packets is smaller than or equal to the packet number threshold, waiting a second period, and calculating the PER in the first period and the second period according to a plurality of second packets received by the first communication unit in the second period.

8. The BS communication module according to claim 6, wherein the CINR adjusting unit further performs the following steps:
   when the PER is smaller than or equal to the error rate threshold, performing the following steps:
      determining whether the PER is zero;
      when the PER is zero, performing the following steps:
         obtaining the CINR return value; and
         comparing a difference of a previous adjustment value and an increase modification coefficient with an adjustment value lower limit, and using the greater one as the CINR adjustment value; and
      calculating the actual return value according to the CINR return value and the CINR adjustment value.

9. The BS communication module according to claim 8, further comprising:
   when the PER is not zero, performing the following steps:
      obtaining the CINR return value; and
      using the previous adjustment value as the CINR adjustment value.

10. The BS communication module according to claim 6, wherein the CINR adjusting unit subtracts the CINR adjustment value from the CINR return value and obtains a difference as the actual return value.

11. A Customer Premise Equipment (CPE) communication module, communicating with a Base Station (BS) communication module and comprising:
   a second communication unit configured for receiving a plurality of first packets in a first period; and
   a Carrier to Interference plus Noise Ratio (CINR) adjusting unit configured for performing the following steps:
      calculating a Packet Error Rate (PER) according to the first packets;
      determining whether the PER is greater than an error rate threshold; and
      when the PER is greater than the error rate threshold, performing the following steps:
         obtaining a CINR return value;
         performing an adjusting procedure to obtain a CINR adjustment value;
         calculating an actual return value according to the CINR return value and the CINR adjustment value; and
         sending the actual return value to the BS communication module, so that the BS communication module selects one of a plurality of Modulation and Coding Schemes (MCSs) according to the actual return value,
      wherein the adjusting procedure comprises:
         comparing a product of the PER and a reduction modification coefficient with a first adjustment value upper limit, and using the smaller one as a first adjustment value; and
         comparing a sum of a previous adjustment value and the first adjustment value with a second adjustment value upper limit, and using the smaller one as the CINR adjustment value.

12. The CPE communication module according to claim 11, wherein in the step of calculating the PER according to the first packets, the CINR adjusting unit performs the following steps:
   determining whether the number of the first packets is smaller than a packet number threshold;
   when the number of the first packets is greater than the packet number threshold, calculating the PER in the first period; and
   when the number of the first packets is smaller than or equal to the packet number threshold, waiting a second period, and calculating the PER in the first period and the second period according to a plurality of second packets received by the second communication unit in the second period.

13. The CPE communication module according to claim 11, wherein the CINR adjusting unit further performs the following steps:
   when the PER is smaller than or equal to the error rate threshold, performing the following steps:
      determining whether the PER is zero;
      when the PER is zero, performing the following steps:
         obtaining the CINR return value; and
         comparing a difference of a previous adjustment value and an increase modification coefficient with an adjustment value lower limit, and using the greater one as the CINR adjustment value; and
      calculating the actual return value according to the CINR return value and the CINR adjustment value.

14. The CPE communication module according to claim 13, further comprising:
   when the PER is not zero, performing the following steps:
      obtaining the CINR return value; and
      using the previous adjustment value as the CINR adjustment value.

15. The CPE communication module according to claim 11, wherein the CINR adjusting unit subtracts the CINR adjustment value from the CINR return value and obtains a difference as the actual return value.

* * * * *